United States Patent
Chang et al.

(10) Patent No.: US 7,295,707 B2
(45) Date of Patent: *Nov. 13, 2007

(54) METHOD FOR ALIGNING GESTURE FEATURES OF IMAGE

(75) Inventors: Chin-Chen Chang, Jubei (TW);
Cheng-Yi Liu, Taipei (TW); I-Yen Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 748 days.

This patent is subject to a terminal disclaimer.

(21) Appl. No.: 10/628,511

(22) Filed: Jul. 29, 2003

(65) Prior Publication Data
US 2005/0089225 A1 Apr. 28, 2005

(30) Foreign Application Priority Data
Jan. 29, 2003 (TW) ................ 92101991 A

(51) Int. Cl.
*G06K 9/00* (2006.01)
*G06K 9/46* (2006.01)

(52) U.S. Cl. ...................... 382/181; 382/203
(58) Field of Classification Search ............. 382/181, 382/203, 170, 190, 201, 266, 279, 294, 305; 345/441, 442
See application file for complete search history.

(56) References Cited

U.S. PATENT DOCUMENTS

| | | | |
|---|---|---|---|
| 5,454,043 A * | 9/1995 | Freeman | 382/168 |
| 5,594,810 A * | 1/1997 | Gourdol | 382/187 |
| 6,456,728 B1 * | 9/2002 | Doi et al. | 382/103 |
| 7,068,843 B2 * | 6/2006 | Chang et al. | 382/203 |

OTHER PUBLICATIONS

Mokhtarian et al. ("Robust and Efficient Shape Indexing through Curvature Scale Space", 1996, Dept. of Electrical Engineering, University of Surrey, England).*

* cited by examiner

*Primary Examiner*—Kanjibhai Patel
(74) *Attorney, Agent, or Firm*—Bacon & Thomas, PLLC

(57) ABSTRACT

A method for aligning gesture features of image is disclosed. An input gesture image is captured, and then a closed curve formed by a binary contour image of the gesture image is determined by processing the gesture image. A curvature scale space (CSS) image of the gesture image is drawn based on the closed curve. A convolution operation is performed with respect to the sequence of a coordinate-peak set formed by the CSS image and a predefined function to designate the coordinate with maximal value of integration as a basis point for obtaining a feature parameter of the gesture image. Finally, comparing the feature parameter of the gesture image with each feature parameter of a plurality of reference gesture shapes, thereby determining a gesture shape corresponding to the gesture image.

14 Claims, 9 Drawing Sheets

METHOD FOR ALIGNING GESTURE FEATURES OF IMAGE

BACKGROUND OF THE INVENTION

1. Field of the Invention

The present invention relates to the technical field of image recognition and, more particularly, to a method for aligning gesture features of image.

2. Description of Related Art

In the field of gesture recognition, the vision-based static gesture recognition is made possible by recognizing posture or shape of a gesture image. Hence, techniques about extracting and matching gesture features (e.g., posture or shape) of image are critical with respect to image recognition.

Conventionally, curvature scale space (CSS) descriptors are utilized for obtaining a quantitative shape feature description of the object for recognizing gesture features of image, thereby providing a reliable feature description even though the shape of the object being adversely affected by size, rotation angle, and movement.

The conventional method for gesture recognition first captures an input gesture image, and then a closed curve formed by a binary contour image of the gesture image is determined by preprocessing the gesture image. A CSS image of the gesture image is drawn based on the closed curve. Next, a coordinate with a maximal peak in a coordinate-peak set formed by the CSS image is selected as a basis point for alignment. A circular rotation is performed to generate an aligned CSS image according to the basis point for determining feature parameters of the gesture image. Finally, each feature parameter of the plurality of sets of the gesture image is compared with each feature parameter of a plurality of reference gesture shapes represented as a basis point of the maximal peak, thereby determining a gesture shape corresponding to the gesture image.

However, the first several peaks have about equal values while exhibiting significant curvature changes in the CSS image of gesture shape due to rugged shape of static gesture in which peak may occur at each of three recessed portions between fingers except the thumb. Taking the gesture image with five fingers of a hand representing digit "5" as an example, the maximal peak of the CSS image of the gesture image may occur at the recessed portion between the thumb and index finger, or at the recessed portion between the index and middle fingers. The CSS images represent the same gesture shape no matter where the maximal peak occurs, but the image recognizer may determine different results with the influence of different maximal peaks. Furthermore, the image recognizer may also determine incorrect result when the CSS image is interfered by noise resulted in some other greater peaks. Due to the local limitation, the curvature can only record the "local" curved degree without labeling the size of the whole recessing or protruding area according to the whole contour. Thus, the conventional image recognizer is unreliable and cannot directly determine the position of fingers in the image.

SUMMARY OF THE INVENTION

An object of the present invention is to provide a method for aligning gesture features of image in which the basis point for alignment is selected based on the two-dimensional distribution of the coordinate-peak set instead of being selected from the coordinate with the maximal peak, thereby solving the location limitation and providing a reliable description of gesture features.

Another object of the present invention is to provide a method for aligning gesture features of image in which curvature scale space is utilized to describe a gesture contour of image for preventing image shape from being adversely affected by size, rotation angle, and movement of image, thereby providing a reliable description of gesture features.

To achieve the objects, the method for aligning gesture features of image of the present invention comprises the steps of: capturing an input gesture image; determining a closed curve formed by a binary contour image of the gesture image by preprocessing the gesture image; drawing a curvature scale space (CSS) image of the gesture image based on the closed curve; performing a convolution operation with respect to the sequence of a coordinate-peak set formed by the CSS image and a predefined function F(x) to designate the coordinate with maximal value of integration as a basis point for obtaining feature parameters of the gesture image; and comparing each feature parameter of the gesture image with each feature parameter of a plurality of reference gesture shapes for determining a gesture shape corresponding to the gesture image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
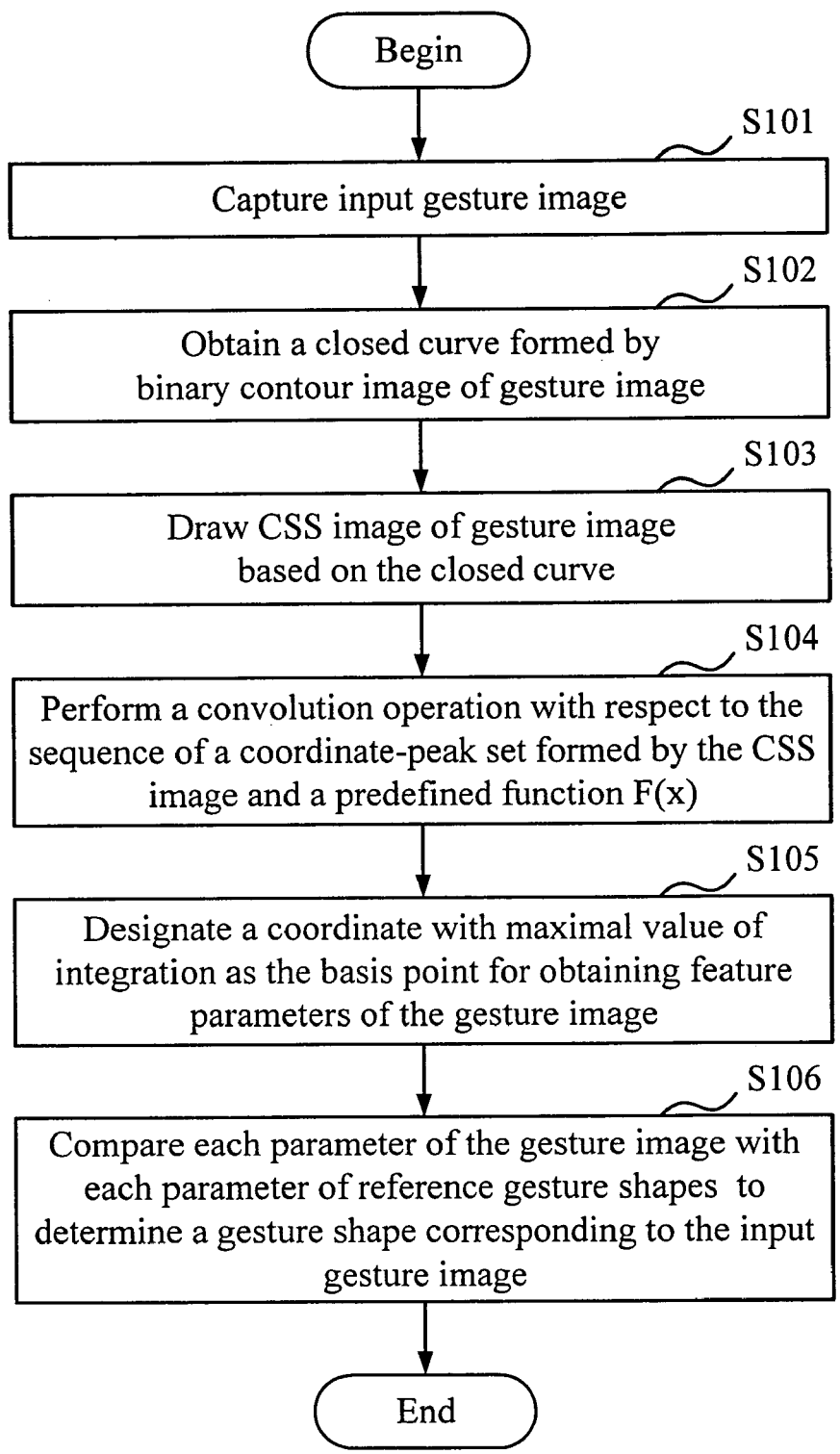
FIG. 1 is a flow chart illustrating a process of aligning gesture features of image according to the invention.

With reference to FIG. 1, there is shown a process of aligning gesture features of image in accordance with preferred embodiment of the present invention. At first, an input gesture image is captured (step S101). Because a gesture feature is recognized based on a contour of gesture image in the present invention, the next step is to obtain a closed curve formed by binary contour image of the input gesture image by dividing the input gesture image by means of image preprocessing technique (step S102). The technique of calculating binary contour image is well known, and thus a detailed description is deemed unnecessary.

The process further enables an image processing device to draw a curvature scale space (CSS) image of gesture contour image based on the closed curve (step S103). Then, a convolution operation is performed with respect to the sequence of a coordinate-peak set formed by the CSS image and a predefined function F(x) in order to obtain a basis point for alignment according to the two-dimensional distribution of the coordinate-peak set (step S104), where $F(x) \geq 0$ and F(x) is an asymmetric function. Next, a coordinate with maximal value of integration is designated as the basis point for obtaining feature parameters of the gesture image (step S105).

For the purpose of recognizing a gesture feature represented by feature parameter $F^I$, there is provided a database including a plurality of feature parameters $F^S$ corresponding to reference gesture shapes for being respectively compared with the feature parameter $F^I$. In general, a static gesture can be used to represent a certain digit. For example, the index finger represents digit "1", the index finger plus middle finger represent digit "2", the five fingers of a hand represent digit "5", and so on. In this embodiment, the database contains various shapes of reference gesture, including different sizes, movements, and rotation angles of gesture, for representing different digits. In addition, the database may contain other various shapes of static gesture such as sign language gesture.

The process further comprises a final step of comparing each parameter $F^I$ of the gesture image with each parameter $F^S$ of reference gesture shapes by utilizing a nearest neighbor algorithm to recognize gesture for finding a nearest reference gesture shape with respect to input gesture image so as to determine a gesture shape corresponding to the input gesture image (step S106).

Figure 2:
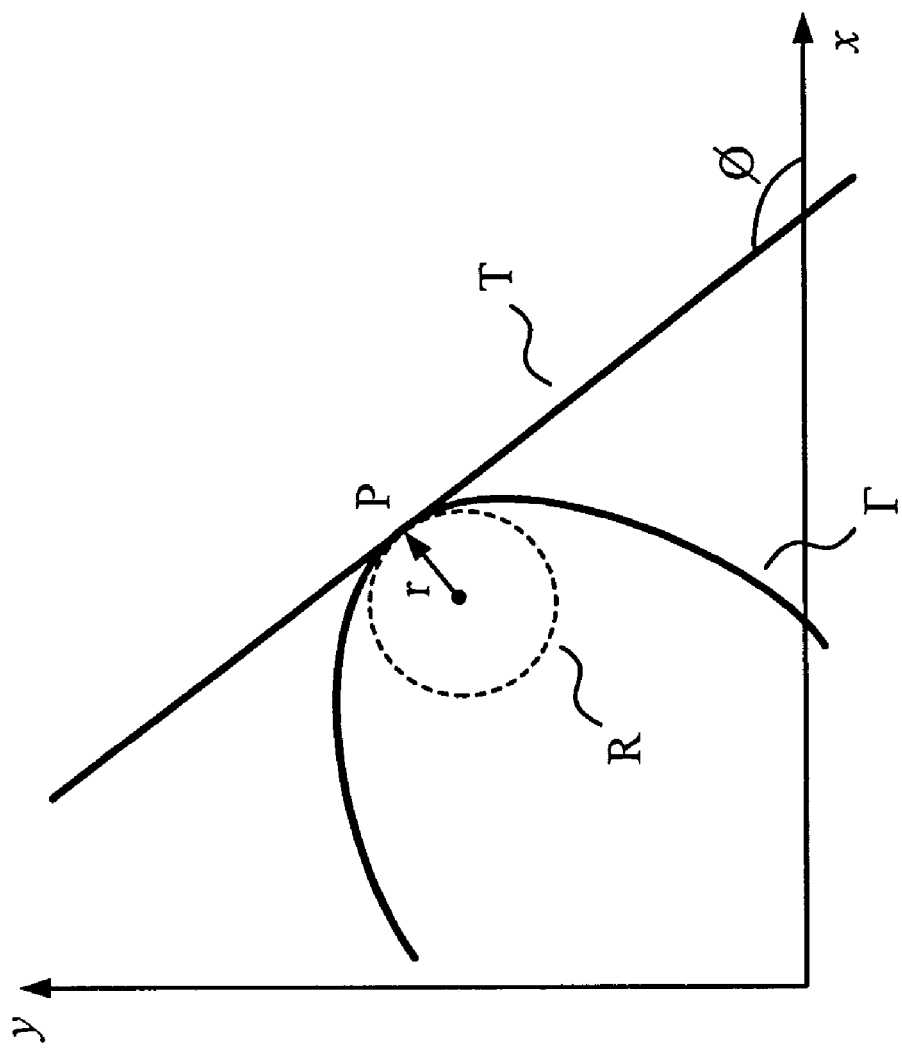
FIG. 2 schematically illustrating a circle of curvature according to the invention.
Figure 3:
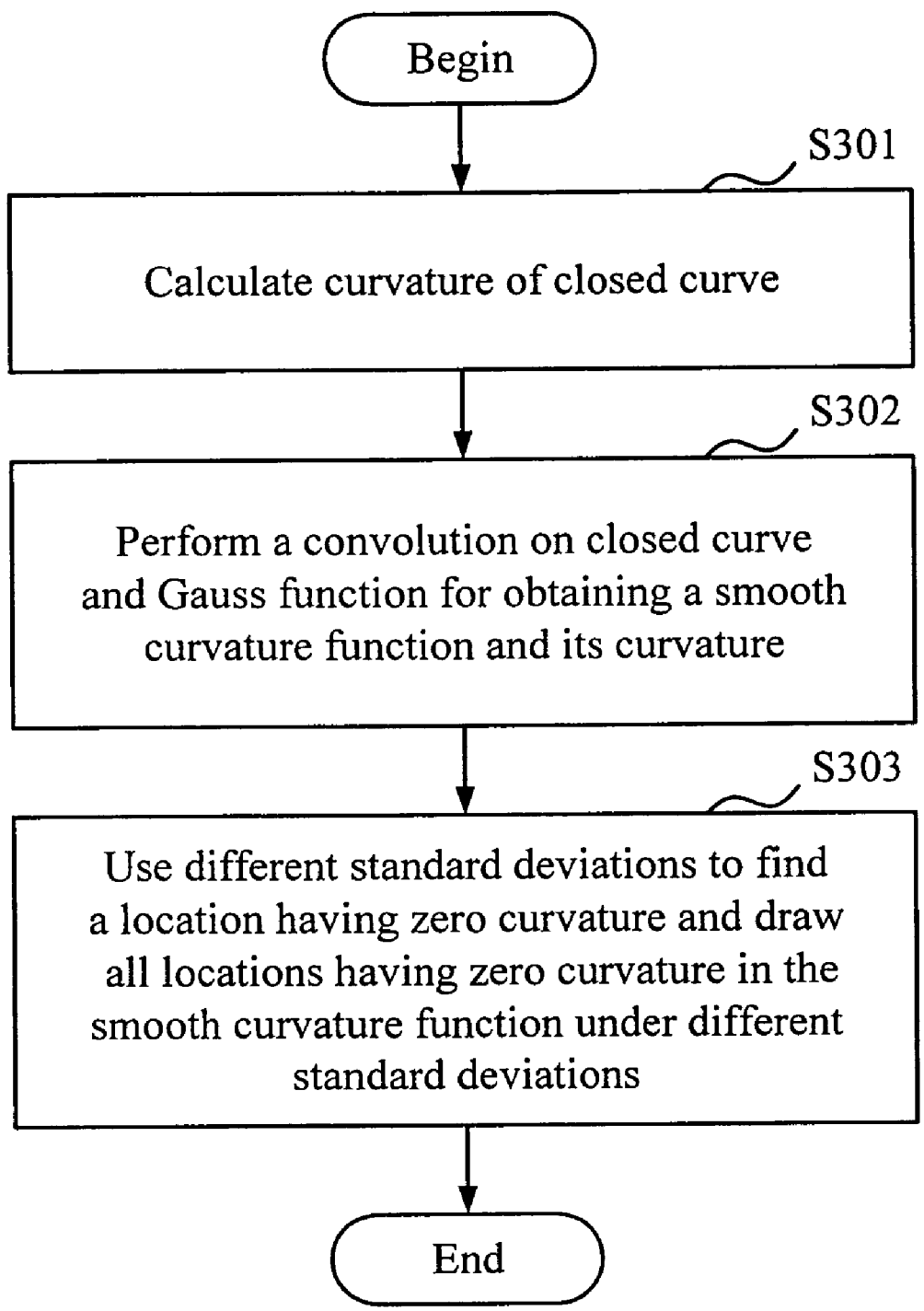
FIG. 3 is a flow chart illustrating a process of calculating curvature scale space image according to the invention.

With reference to FIG. 3 and FIG. 2, the detailed process of the step S103 for calculating CSS image is illustrated. In FIG. 2, curvature κ at point P of closed curve Γ is defined as either gradient angle of tangent (P with respect to arc length parameter u on the instant of time or an inverse of radius r of circle of curvature R. Thus, curvature κ can be expressed in the following equation:

$$\kappa = \frac{d\phi}{du} = \frac{1}{r}.$$

Also, closed curve Γ can be expressed as {x(u), y(u)} in terms of arc length parameter u in which u is normalized to have a value between 0 and 1. After rearrangement, above curvature κ of closed curve Γ can be expressed as follows:

$$\kappa(u) = \frac{\dot{x}(u)\ddot{y}(u) - \ddot{x}(u)\dot{y}(u)}{(\dot{x}^2(u) + \dot{y}^2(u))^{3/2}} \quad \text{(step } S301\text{)},$$

where $\dot{x}(u) = \frac{dx}{du}$, $\ddot{x}(u) = \frac{d^2x}{du^2}$, $\dot{y}(u) = \frac{dy}{du}$ and $\ddot{y}(u) = \frac{d^2y}{du^2}$.

Next, a convolution operation is performed with respect to closed curve Γ and an one-dimensional Gauss function g(u,σ) for obtaining a smooth curvature function $\Gamma_\sigma = \{X(u,\sigma), Y(u,\sigma)\}$ and its curvature:

$$\kappa(u, \sigma) = \frac{X_u(u, \sigma)Y_{uu}(u, \sigma) - X_{uu}(u, \sigma)Y_u(u, \sigma)}{(X_u(u, \sigma)^2 + Y_u(u, \sigma)^2)^{3/2}} \quad \text{(step } S302\text{)},$$

where σ is standard deviation. The Gauss function can be expressed as follows:

$$g(u, \sigma) = \frac{1}{\sigma\sqrt{2\pi}} \exp\left(\frac{-u^2}{2\sigma^2}\right),$$

and X(u,σ) and Y(u,σ) in the smooth curvature function $\Gamma_\sigma$ can be expressed respectively as follows:

$$X(u, \sigma) = x(u) * g(u, \sigma) = \int_{-\infty}^{\infty} x(v) \cdot \frac{1}{\sigma\sqrt{2\pi}} \cdot \exp\left(\frac{-(u-v)^2}{2\sigma^2}\right) dv,$$

$$Y(u, \sigma) = y(u) * g(u, \sigma) = \int_{-\infty}^{\infty} y(v) \cdot \frac{1}{\sigma\sqrt{2\pi}} \cdot \exp\left(\frac{-(u-v)^2}{2\sigma^2}\right) dv.$$

Moreover, $X_u(u,\sigma)$, $X_{uu}(u,\sigma)$, $Y_u(u,\sigma)$ and $Y_{uu}(u,\sigma)$ of curvature κ(u,σ) are expressed respectively as follows:

$$X_u(u, \sigma) = x(u) * \dot{g}(u, \sigma), X_{uu}(u, \sigma) = x(u) * \ddot{g}(u, \sigma),$$

$$Y_u(u, \sigma) = y(u) * \dot{g}(u, \sigma), Y_{uu}(u, \sigma) = y(u) * \ddot{g}(u, \sigma),$$

where $\dot{g}(u, \sigma) = \frac{\partial}{\partial u} g(u, \sigma)$ and $\ddot{g}(u, \sigma) = \frac{\partial^2}{\partial u^2} g(u, \sigma)$.

Generally, a smooth curve has a higher resolution when σ is relatively small while having a lower resolution when σ is relatively large. Hence, the contour drawn by $\Gamma_\sigma = \{X(u,\sigma), Y(u,\sigma)\}$ is more smooth as σ increases. Finally, different standard deviations σ are used to find a location having zero curvature in $\Gamma_\sigma = \{X(u,\sigma), Y(u,\sigma)\}$ and thus all locations having zero curvature are drawn under different standard deviations σ (S303). As a result, a CSS image of input gesture image contour is obtained.

Figure 4:
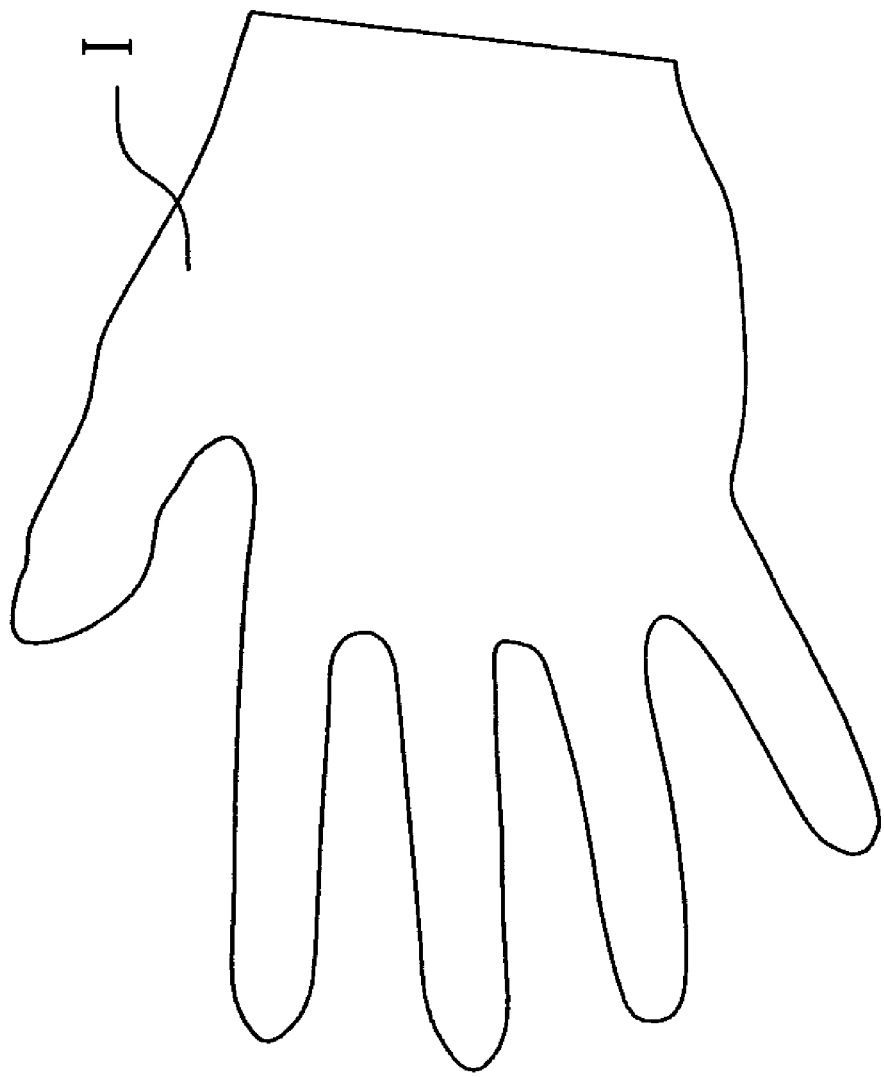
FIG. 4 is a schematic drawing of binary contour image of the gesture image according to the invention.
Figure 5:
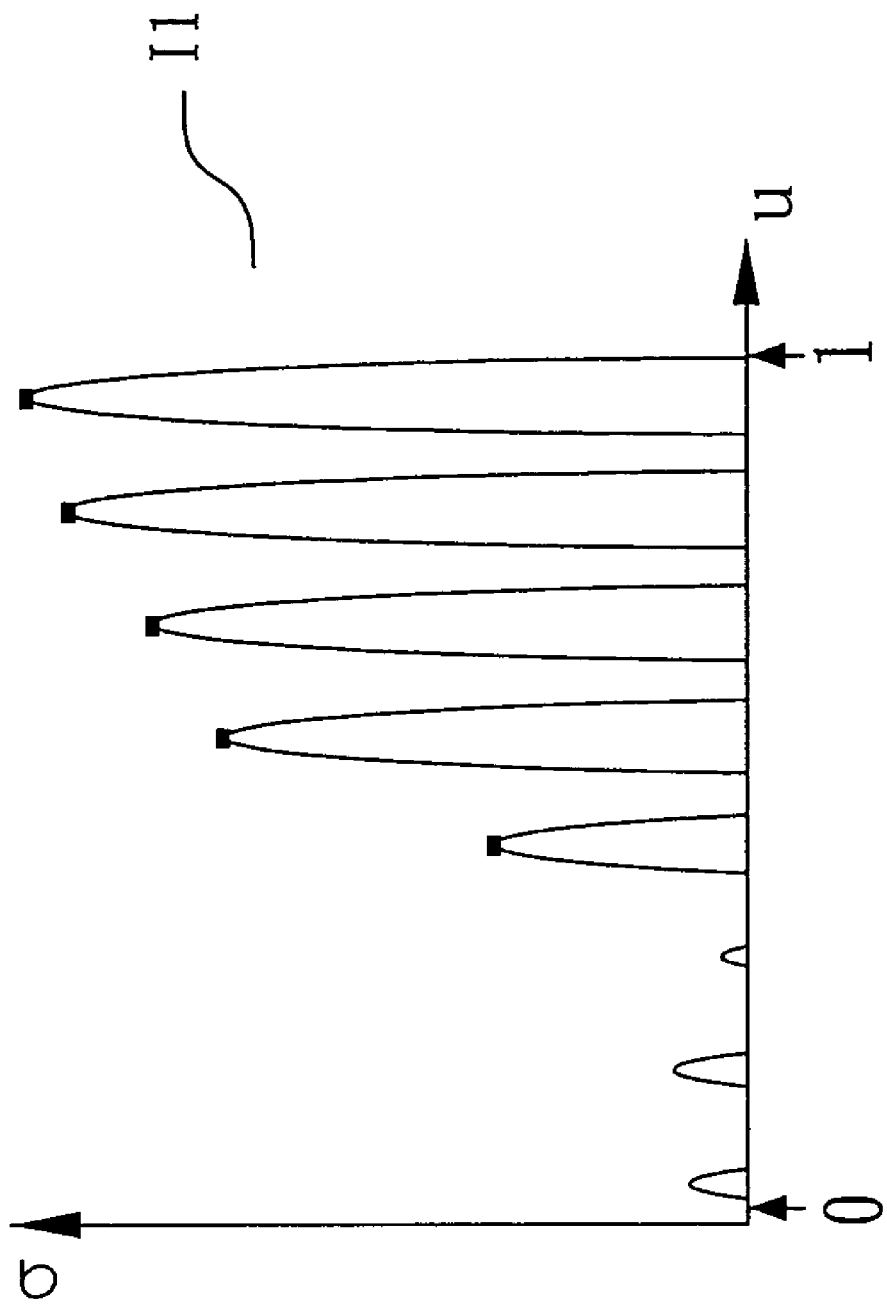
FIG. 5 is a chart depicting the curvature scale space image of FIG. 4.

With reference to FIG. 4, there is shown a schematic drawing of a binary contour image of the input gesture image I. Based on the above process, the u-σ coordinate I1 depicting the input gesture image I shown in FIG. 4 is determined as illustrated in FIG. 5, where axis of abscissa is u which is normalized to have a value between 0 and 1 and axis of ordinate is σ. In the u-σ coordinate, the position of κ(u,σ)=0 is defined as zero curvature point.

Figure 6:
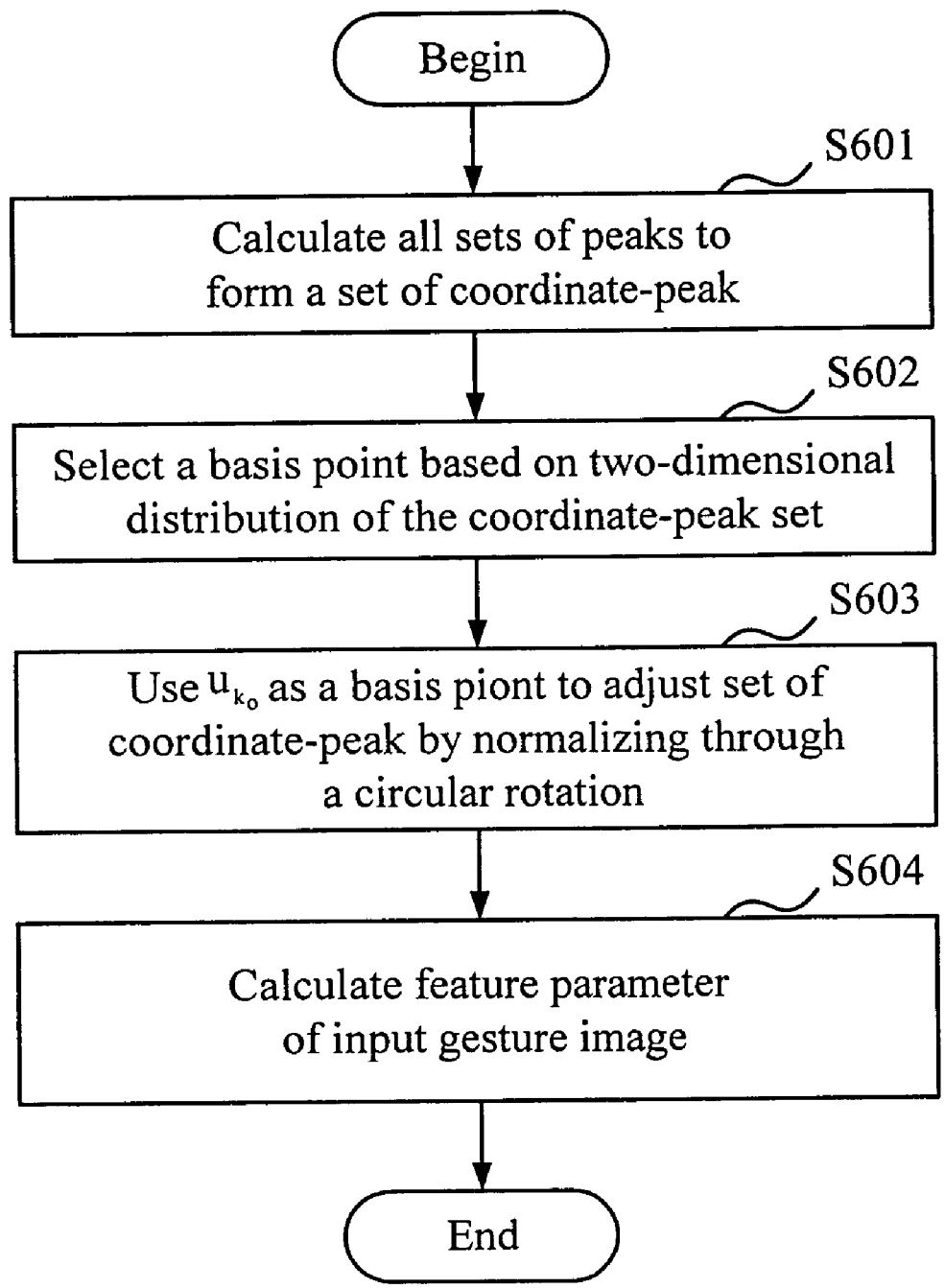
FIG. 6 is a flow chart illustrating a process of calculating feature parameters of the gesture image according to the invention.

In response to the drawing of CSS image of input gesture I, an extraction of feature parameters $F^I$ of input gesture image I is calculated based on a process illustrated in the flow chart of FIG. 6. First, all sets of peaks in CSS image are calculated to form a set of coordinate-peak (step S601), which is denoted as u-σ set, and expressed as $$\{(u_i, \sigma_i)\}_{i=1,\ldots,N}^{Original} = (u_1, \sigma_1), (u_2, \sigma_2), \ldots, (u_j, \sigma_j), \ldots, (u_N, \sigma_N)\},$$

where N is the number of all detected peaks in CSS image. Next, a basis point $k_o$ is selected based on the two-dimensional distribution of the coordinate-peak set (step S602) expressed as:

$$k_o = \underset{k}{\operatorname{argmax}} \left( \sum_{i=1}^{k-1} \sigma_i \cdot F(1 + u_i - u_k) + \sum_{i=k}^{N} \sigma_i \cdot F(u_i - u_k) \right),$$

so as to solve the local limitation of the prior method for selecting coordinate with the maximal peak.

Figure 7:
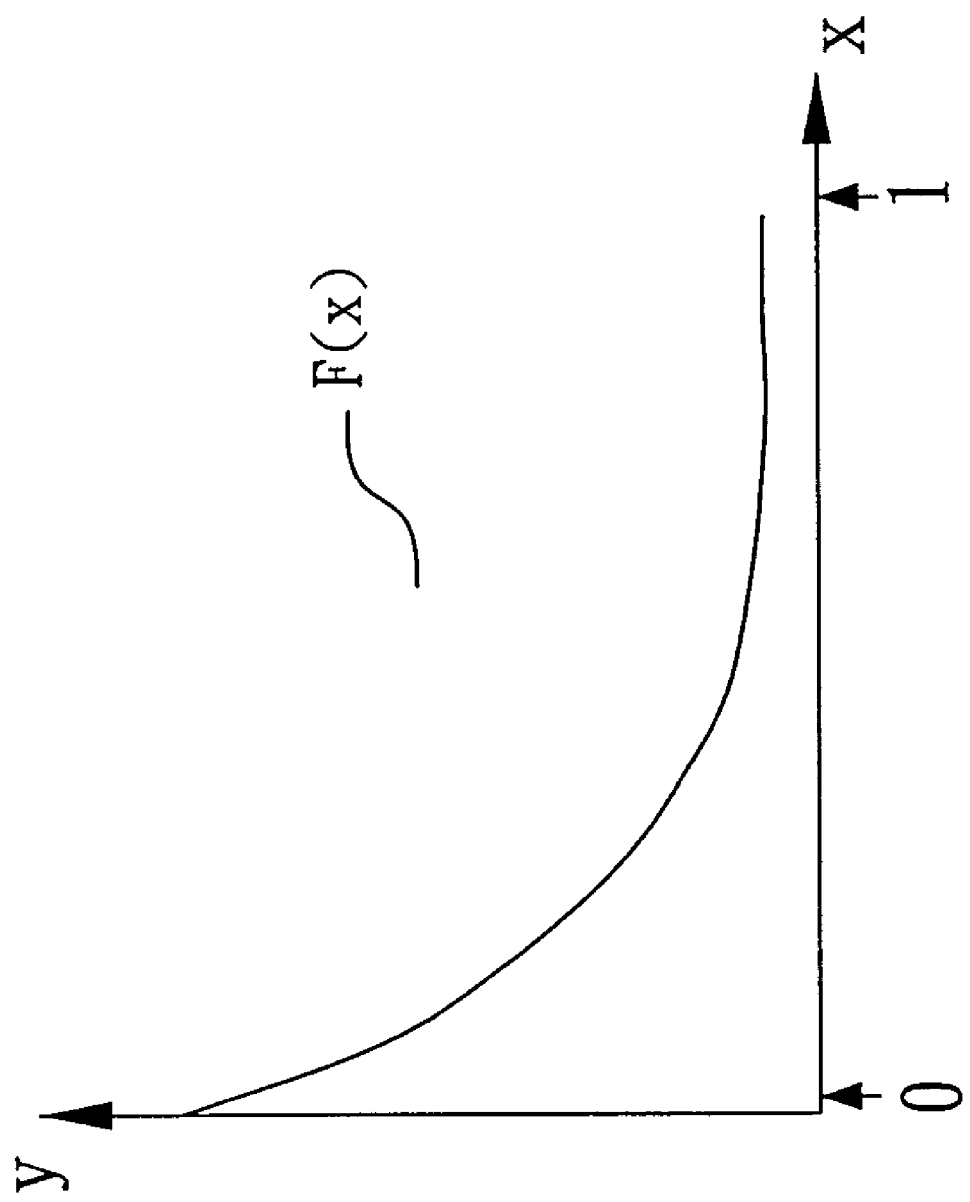
FIG. 7 is a schematic drawing of the predefined function according to the invention.

In the aforementioned function for selecting the basis point, F(x) is a zero-mean Gauss function having a value between 0 and 1, for example, $$F(x) = \frac{e^{-[x^2/2\sigma^2]}}{\sqrt{2\pi}\,\sigma}, \quad 0 \leq x < 1,$$

where σ is defined for controlling the changing rate of F(x) in the period of [0,1). In order to reduce the probability of obtaining multiple identical maximal values, the value field of F(x) is defined as F(x)≧0, where F(x) is an absolute increasing or decreasing asymmetric function, or a non-continuous function. In this embodiment, F(x) is an absolute decreasing function as illustrated in FIG. 7. Since zero-mean Gauss function is a one-to-one function in the period of [0,1), the probability of obtaining multiple basis points $k_o$ of functions, such as surge function, step function, or the like, if the inputted coordinate-peak set is non-periodical or symmetric. The function used for selecting basis points can be taken as performing a convolution operation with respect to $$\{(u_i, \sigma_i)\}_{i=1,\ldots,N}^{Original}$$

and F(x) so as to extract the coordinate $u_{k_o}$ with the maximal value of integration from the u-σ coordinate I1.

Figure 8:
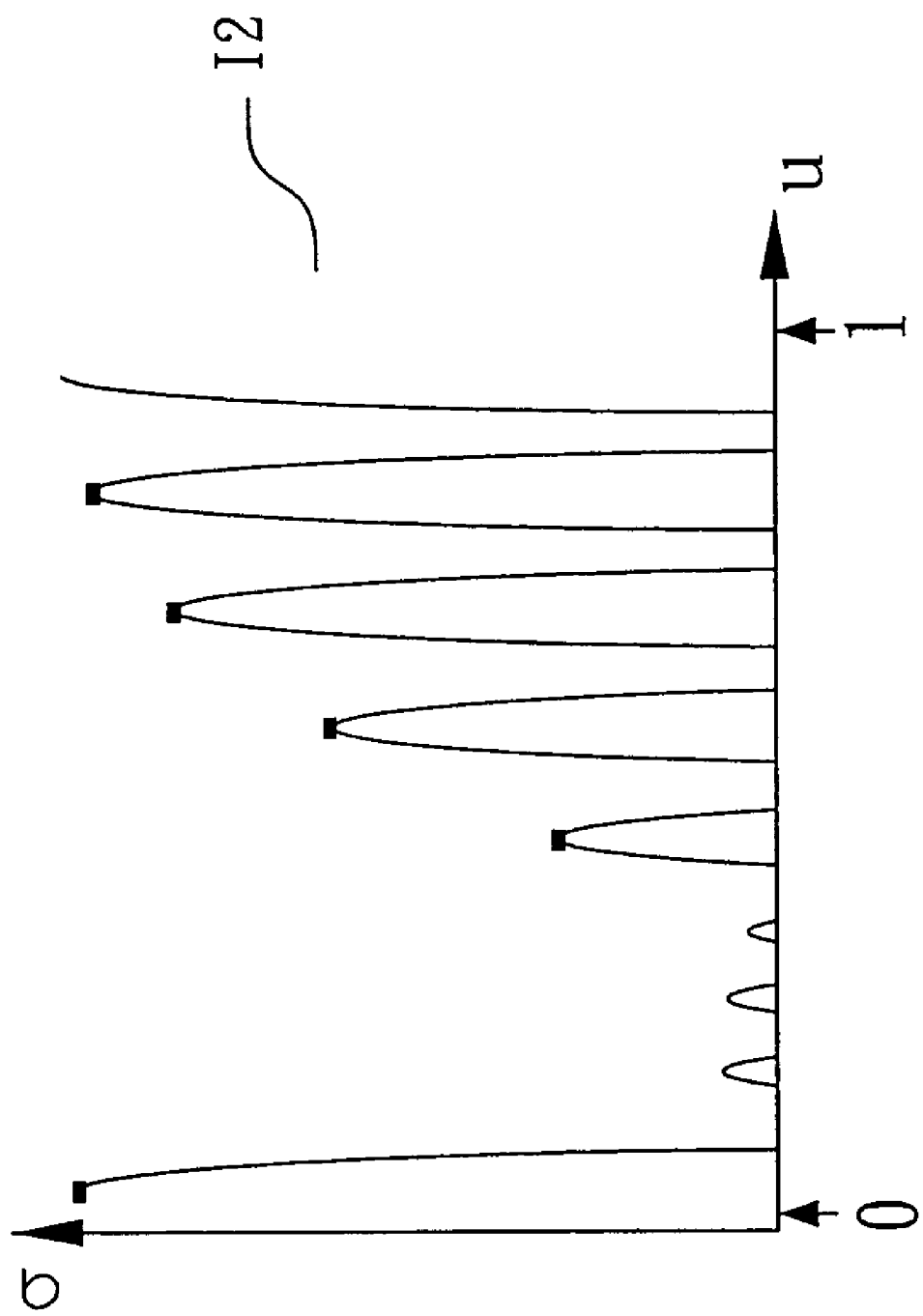
FIG. 8 is a schematic drawing of the aligned curvature scale space image according to the invention.

Then, the u-σ coordinate I1 can be expressed as the following coordinate-peak set after being aligned through a circular rotation with respect to $u_{k_o}$ (i.e. basis point) to obtain an aligned u-σ coordinate I2 as shown in FIG. 8 (step S603):

$$\{(u_i, \sigma_i)\}_{i=1,\ldots,N}^{aligned} = \{(0, \sigma_{k_o}), (u_{k_o+1} - u_{k_o}, \sigma_{k_o+1}),$$
$$\ldots, (1 + u_1 - u_{k_o}, \sigma_1), \ldots, (1 + u_{k_o-1} - u_{k_o}, \sigma_{k_o-1})\},$$

in which u=0 is the position of the maximal peak corresponding to u-axis. As a result, feature parameter $$F^I = \{(u_i^I, \sigma_i^I)\}_{i=1,\ldots,N}^{aligned}$$

of the input gesture image I can be calculated according to the aligned u-σ coordinate I2 (step S604), where N is the number of all of the detected peaks in the CSS image, I is the input gesture image I.

After obtaining the feature parameter $F^I$ of the input gesture image I, the step S106 as shown in FIG. 1 is performed to compare $F^I$ with feature parameter $F^S$ of reference gesture shape. As a result, a possible similarity between $F^I$ and $F^S$ is obtained to determine a corresponding gesture shape of input gesture image I. The feature parameter $F^S$ of predetermined reference gesture shape in the database can be expressed as $$F^S = \{(u_j^S, \sigma_j^S)\}_{j=1,\ldots,M}^{aligned},$$

where M is the number of peaks of reference gesture shape, and S is the reference gesture shape.

Figure 9:
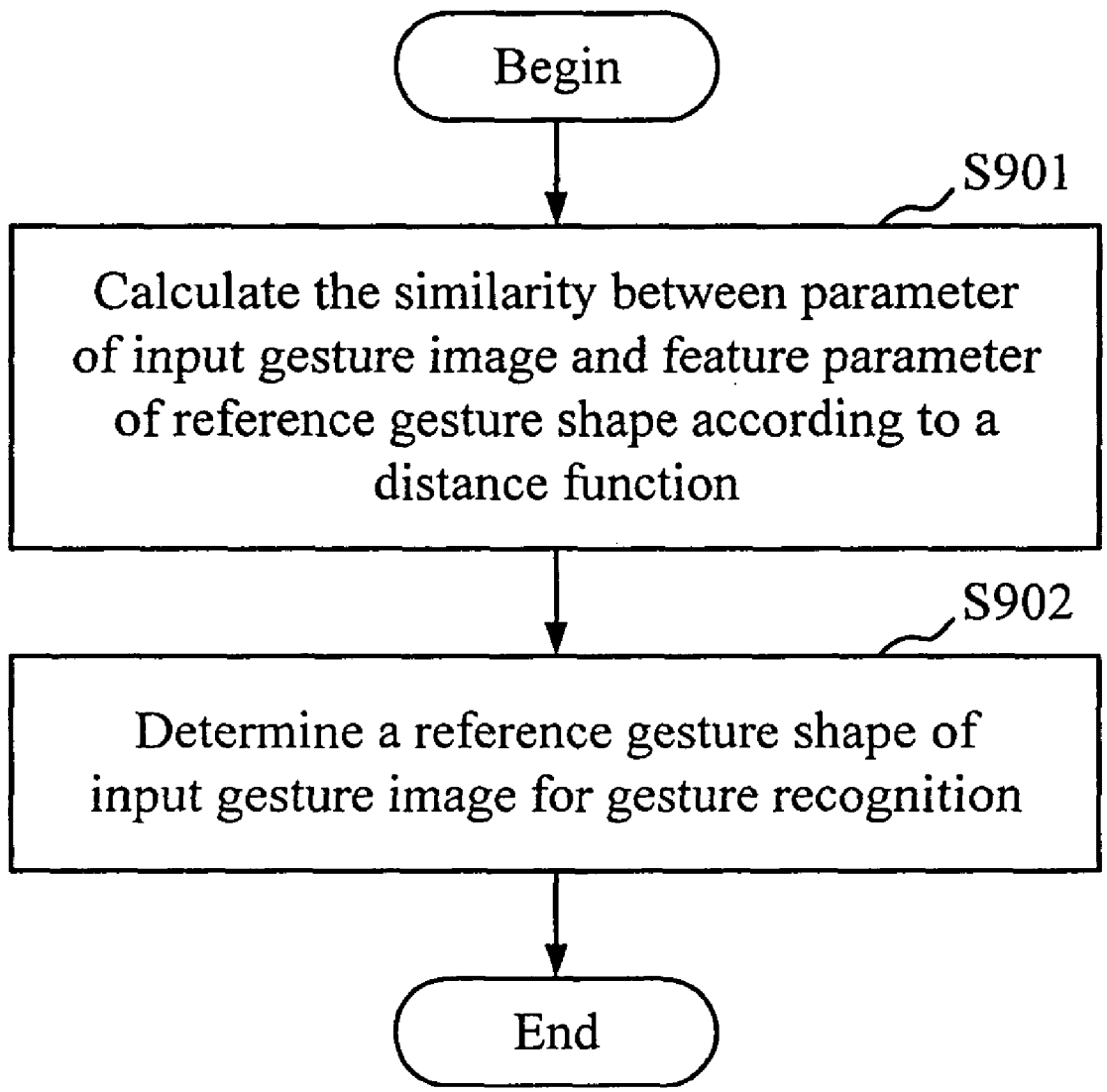
FIG. 9 is a flow chart illustrating a process of comparing feature parameter of input gesture image with feature parameter of predetermined reference gesture shape according to the invention.

With reference to FIG. 9, there is shown a flow chart illustrating a process of comparing $F^I$ with $F^S$. First, a distance function is employed to obtain a sum of distance of the matched peaks and distance of the unmatched peaks between $F^I$ and $F^S$ (step S901). The distance function of this embodiment can be expressed as follows:

$$dist(F^I, F_S) = \sum_{\substack{matched \\ peaks}} \sqrt{(u_i^I - u_j^S)^2 + (\sigma_i^I - \sigma_j^S)^2} + \sum_{\substack{unmatched \\ peaks}} \sigma_i^I + \sum_{\substack{unmatched \\ peaks}} \sigma_j^S,$$

which indicates that a small distance refers to a high similarity of two shapes.

Finally, a nearest neighbor algorithm is utilized to determine a reference gesture shape of the input gesture image I for gesture recognition (step S902). Therefore, the image processing device can follow the aforesaid functions to find out the nearest reference gesture shape with respect to input gesture image I in the process of recognition.

In view of the foregoing, the method for aligning gesture features of image according to the present invention can directly determine the position of fingers in the image. This invention can also find out the areas having greater recessed portions by utilizing the tendency of combining the process of gradually smoothing the image and the CSS data corresponding to the image. As for the gesture image, the area having greater recessed portion is one of the possible recessed portions between fingers, thus those more obvious recessed portions in the gesture image can be figured out according to the present invention.

It is known that the invention ensures the extracted CSS image to be reliable after being aligned. The invention can be applied in games, human computer interfaces, sign language recognition, video surveillance, image and video retrieval, etc. Particularly, the invention is suitable in game related applications which require features of gesture recognition, smooth manipulation, highly interaction between players and game, to greatly increase entertainment effect.

Although the present invention has been explained in relation to its preferred embodiment, it is to be understood that many other possible modifications and variations can be made without departing from the spirit and scope of the invention as hereinafter claimed.

What is claimed is:

1. A method for aligning gesture features of image, comprising the steps of:
    capturing an input gesture image;
    determining a closed curve formed by a binary contour image of the gesture image by preprocessing the gesture image;
    drawing a curvature scale space (CSS) image of the gesture image based on the closed curve;
    performing a convolution operation with respect to the sequence of a coordinate-peak set formed by the CSS image and a predefined function F(x) to designate the coordinate with maximal value of integration as a basis point for obtaining feature parameters of the gesture image, wherein each feature parameter of the gesture image is obtained by the steps of calculating all sets of the peaks in the CSS image to form a coordinate-peak set;

selecting a basis point $k_o$ according to two-dimensional distribution of the coordinate-peak set;

performing a convolution operation with respect to the coordinate-peak set and the predefined function so as to extracting a coordinate $u_{k_o}$ with maximal value of integration as the basis point to align the coordinate-peak set through a circular rotation to form an aligned coordinate-peak set;

calculating the feature parameter based on the aligned coordinate-peak set; and comparing each feature parameter of the gesture image with each feature parameter of a plurality of reference gesture shapes for determining a gesture shape corresponding to the gesture image.

2. The method as claimed in claim 1, wherein in the step of performing a convolution operation to designate the coordinate, the coordinate-peak set is expressed as:

$$\{(u_i, \sigma_i)\}_{i=1,\ldots,N}^{Orginal} = \{(u_1, \sigma_1), (u_2, \sigma_2), \ldots, (u_j, \sigma_j), \ldots, (u_N, \sigma_N)\},$$

where N is the number of all of the detected peaks in the CSS image;

the basis point $k_o$ is expressed as $$k_o = \underset{k}{\operatorname{argmax}}\left(\sum_{i=1}^{k-1} \sigma_i \cdot F(1 + u_i - u_k) + \sum_{i=k}^{N} \sigma_i \cdot F(u_i - u_k)\right);$$

the aligned coordinate-peak set is expressed as $$\{(u_i, \sigma_i)\}_{i=1,\ldots,N}^{aligned} = \{(0, \sigma_{k_o}), (u_{k_o+1} - u_{k_o}, \sigma_{k_o+1}),$$
$$\ldots, (1 + u_1 - u_{k_o}, \sigma_1), \ldots, (1 + u_{k_o-1} - u_{k_o}, \sigma_{k_o-1})\}; \text{ and}$$

the feature parameter is expressed by $$F^I = \{(u_i^I, \sigma_i^I)\}_{i=1,\ldots,N}^{aligned},$$

where N is the number of all of the detected peaks in the CSS image, I is the input gesture image.

3. The method as claimed in claim 2, wherein in the step of selecting a basis point, F(x) is defined between the period of [0,1).

4. The method as claimed in claim 3, wherein F(x) is a zero-mean Gauss function.

5. The method as claimed in claim 4, wherein the zero-mean Gauss function is:

$$F(x) = \frac{e^{-[x^2/2\sigma^2]}}{\sqrt{2\pi}\,\sigma}, \; 0 \leq x < 1,$$

where σ is defined for controlling the changing rate of F(x) in the period of [0,1).

6. The method as claimed in claim 1, wherein in the step of selecting a basis point, F(x) is an absolute increasing or decreasing function.

7. The method as claimed in claim 1, where in the step of comparing each feature parameter of the gesture image with each feature parameter of a plurality of reference gesture shapes, the feature parameter $F^S$ of predetermined reference gesture shape is expressed as $$F^S = \{(u_j^S, \sigma_j^S)\}_{j=1,\ldots,M}^{aligned},$$

where M is the number of the peaks of the reference gesture shape, and S is the reference gesture shape.

8. The method as claimed in claim 7, wherein the step of comparing each feature parameter of the gesture image with each feature parameter of a plurality of reference gesture shapes comprises the steps of:

obtaining a sum of distance of the matched peaks and distance of the unmatched peaks between the feature parameter $F^I$ of the gesture image and the feature parameter FS of the reference gesture shapes by performing a distance function:

$$dist(F^I, F_S) = \sum_{\substack{matched \\ peaks}} \sqrt{(u_i^I - u_j^S)^2 + (\sigma_i^I - \sigma_j^S)^2} + \sum_{\substack{unmatched \\ peaks}} \sigma_i^I + \sum_{\substack{unmatched \\ peaks}} \sigma_j^S;$$

and utilizing a nearest neighbor algorithm to determine a reference gesture shape of the gesture image.

9. The method as claimed in claim 8, wherein in the step of utilizing a nearest neighbor algorithm to determine a reference gesture shape of the gesture image, the nearest neighbor algorithm is utilized to recognize gesture for finding the nearest reference gesture shape with respect to the gesture image so as to determine a gesture shape corresponding to the gesture image.

10. The method as claimed in claim 1, wherein in the step of drawing a curvature scale space (CSS) image, the CSS image is obtained by performing the steps of:

determining a curvature $$\kappa(u) = \frac{\dot{x}(u)\ddot{y}(u) - \ddot{x}(u)\dot{y}(u)}{(\dot{x}^2(u) + \dot{y}^2(u))^{3/2}}$$

of a closed curve $\Gamma = \{x(u), y(u)\}$, where u is a normalized arc length parameter, $$\dot{x}(u) = \frac{dx}{du}, \; \ddot{x}(u) = \frac{d^2x}{du^2}, \; \dot{y}(u) = \frac{dy}{du}, \text{ and } \ddot{y}(u) = \frac{d^2y}{du^2};$$

performing an operation with respect to the closed curve and a Gauss function to determine a smooth curvature function $\Gamma_\sigma = \{X(u,\sigma), Y(u,\sigma)\}$ and its curvature $$\kappa(u,\sigma) = \frac{X_u(u,\sigma)Y_{uu}(u,\sigma) - X_{uu}(u,\sigma)Y_u(u,\sigma)}{(X_u(u,\sigma)^2 + Y_u(u,\sigma)^2)^{3/2}}$$

where
$\sigma$ is standard deviation, $$X(u,\sigma) = x(u) * g(u,\sigma) = \int_{-\infty}^{\infty} x(v) \cdot \frac{1}{\sigma\sqrt{2\pi}} \cdot \exp\left(\frac{-(u-v)^2}{2\sigma^2}\right) dv,$$

$$Y(u,\sigma) = y(u) * g(u,\sigma) = \int_{-\infty}^{\infty} y(v) \cdot \frac{1}{\sigma\sqrt{2\pi}} \cdot \exp\left(\frac{-(u-v)^2}{2\sigma^2}\right) dv,$$

$$X_u(u,\sigma) = x(u) * \dot{g}(u,\sigma), \; X_{uu}(u,\sigma) = x(u) * \ddot{g}(u,\sigma),$$

$$Y_u(u,\sigma) = y(u) * \dot{g}(u,\sigma), \; Y_{uu}(u,\sigma) = y(u) * \ddot{g}(u,\sigma),$$

$$\dot{g}(u,\sigma) = \frac{\partial}{\partial u}g(u,\sigma), \text{ and } \ddot{g}(u,\sigma) = \frac{\partial^2}{\partial u^2}g(u,\sigma); \text{ and}$$

utilizing different standard deviations $\sigma$ to find a location having zero curvature in $\Gamma_\sigma$, and continuously drawing all locations having zero curvature under different standard deviations.

11. The method as claimed in claim 10, wherein the normalized arc length parameter u has a value between 0 and 1.

12. The method as claimed in claim 10, wherein in the step of performing an operation with respect to the closed curve and a Gauss function, the operation performed with respect to the close curve and the Gauss function is a convolution operation.

13. The method as claimed in claim 10, wherein in the step of performing an operation with respect to the closed curve and a Gauss function, the Gauss function is:

$$g(u,\sigma) = \frac{1}{\sigma\sqrt{2\pi}} \cdot \exp\left(\frac{-u^2}{2\sigma^2}\right).$$

14. The method as claimed in claim 10, wherein in the step of utilizing different standard deviations to find a location having zero curvature, in the u–$\sigma$ coordinate, a position of $\kappa(u,\sigma)=0$ is defined as the zero curvature point.

* * * * *